Nov. 17, 1959  E. BORDINAT, JR., ET AL  2,913,545
SPEED WARNING DEVICE
Filed Jan. 18, 1957  2 Sheets-Sheet 1

E. BORDINAT, JR.
G. O. HIBBARD
INVENTORS.

BY
E. C. McRae
J. R. Faulkner
F. H. Oster

ATTORNEYS

Nov. 17, 1959     E. BORDINAT, JR., ET AL     2,913,545
SPEED WARNING DEVICE
Filed Jan. 18, 1957                          2 Sheets-Sheet 2

E. BORDINAT, JR.
G. O. HIBBARD
INVENTORS.

BY

ATTORNEYS

United States Patent Office 2,913,545
Patented Nov. 17, 1959

2,913,545

SPEED WARNING DEVICE

Eugene Bordinat, Jr., Bloomfield Hills, and Gerald O. Hibbard, Birmingham, Mich., assignors to Ford Motor Company, Dearborn, Mich., a corporation of Delaware Application January 18, 1957, Serial No. 634,984

5 Claims. (Cl. 200—56)

This invention relates to a warning device and more particularly to a manually set warning device for use with a speedometer used in motor vehicles and the like.

Because of present day driving conditions, a motor vehicle operator more than likely exceeds the legal speed limit in a day's time without realizing it. In the past, numerous devices have been employed by manufacturers including those using colored lights depicting a so-called safe (green), caution (amber) and red (danger) speed zones. These devices have been helpful, but not entirely successful from the speed warning standpoint. The zones are too broad and cannot be pinpointed to a specific speed which, of course, will vary, particularly in city driving.

In the instant application, the operator turns a selector knob connected to a trigger mechanism and an annular dial until he displays the speed he does not wish to exceed. The speedometer dial is provided with a trigger pin which trips the trigger mechanism when the selected speed has been reached by the vehicle. A contact is made by the trigger mechanism causing a light to flash or a buzzer to buzz, or both. The warning device will continue to operate until the speed is decreased below the set speed, allowing the trigger pin on its way back to again trip the trigger from the reverse direction and break the contact. By turning the knob to the end of the scale, the trigger mechanism is rotated to the point that is beyond the speed of the vehicle hence the device is made inoperative.

Other objects and advantages will become more apparent when considered in connection with the accompanying drawings wherein.

Figure 1:
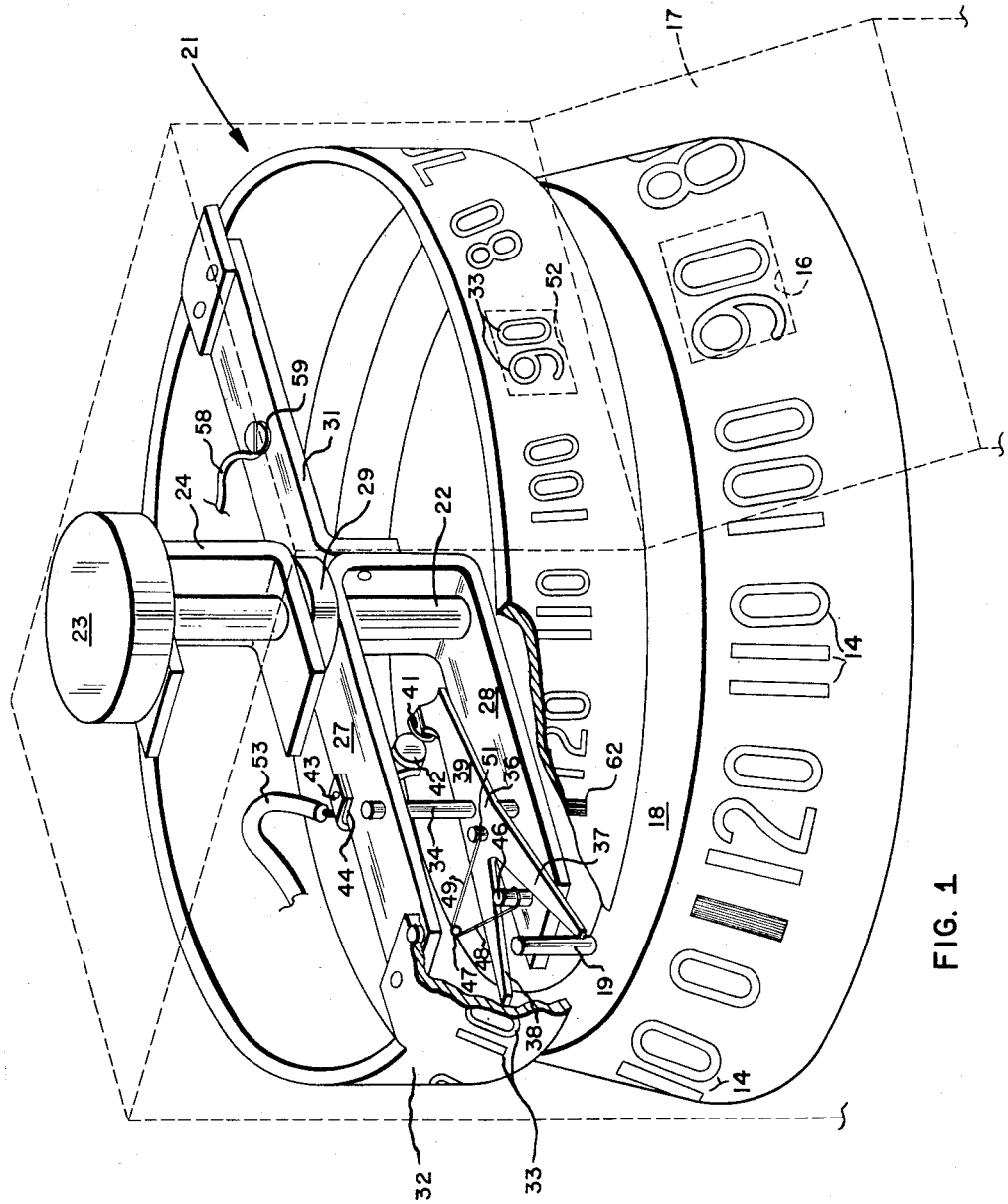
Figure 1 is a perspective view of a speedometer mechanism of a motor vehicle incorporating the present invention.

Referring now to the drawings, a magnetically driven eddy current speedometer is shown having a speedometer drive mechanism 11 driven by a conventional cable 12 and equipped with an annular horizontally rotating angled dial face 13. The dial face 13 has a series of speed indicating indicia 14 equally spaced about the periphery of the dial 13. As is common with this type of speedometer, a hairspring (not shown) is finally calibrated in relation to the magnetic pull to indicate true speed and also serves to pull the indicator dial toward zero as the vehicle is slowed and hold the dial on "zero" when the vehicle is stopped. The indicia 14 is shown to the operator of the vehicle through a rectangular aperture 16 in the housing 17. The dial 13 has a flat annular area 18 inwardly of the peripheral edge of the dial and has an upstanding trip pin 19 secured to the area 18 in vertical alignment with the indicia 14 indicating immobility of the vehicle or the "0" speed. The warning device is generally indicated at 21 and is located substantially within the housing 17 except for the pivot pin 22 which extends through the top of the housing and has a knob 23 secured to its end thereto for rotating the pin. The pin 22 extends through a U shaped bracket 24 which is weldably secured to the underside of the housing 17 and stabilizes the pivot pin 22 in a vertical plane. A second substantially U shaped bracket 26 having an upper arm 27 and a shorter lower arm 28 is fixedly secured to the lower portion of the pivot pin 22 and is separated from the support bracket 24 by a spacer 29. An L shaped bracket 31 is weldably secured to the closed end of the bracket 26 and extends radially outwardly the distance equal to that of the upper arm 27. A radial selector dial 32 is secured to the upper arm 27 and the L shaped bracket 31 and has displayed thereon speed indicating indicia 33 in equally spaced proportions equal to the indicia 14 shown on the speedometer dial 13. A second vertical pivot 34 is mounted between and to the upper and lower arms 27 and 28 and axially offset from the pivot 22. A Y shaped trigger 36 is rotatably secured to the pivot 34 with its open arms 37 and 38 respectively extending outwardly beyond the end of the lower arm 28. The stem end 39 of the trigger 36 has a generally vertical contact 41 which is adapted to swing into the contact 42 mounted on an inwardly and downwardly extending support arm 43 fixedly secured to the upper arm 29 with an insulator 44 interposed between the support arm 43 and the upper arm 29.

The trigger arms 37 and 38 straddle a spring anchor 46 secured to the lower arm 28 medially of its sides and near its outward end in the same vertical plane as the pivot 34. A delicately balanced spring 47 has one arm 48 secured to the anchor 46 and the other arm 49 to a similar anchor 51 which is secured medially and rearwardly of the arms 37 and 38 on the trigger mechanism 36. Normally, the spring 47 holds the trigger mechanism slightly angled so that the contacts 41 and 42 are separated and the arm 37 is extended radially outwardly farther than the like arm 38. In this position, the trip arm 19 must contact the arm 37.

The device is operated by turning the knob 23 until the appropriate selector dial indicia 33 is displayed through the aperture 52. This movement results in the like movement of the trigger mechanism to the right. In Figure 1, the selector dial has been moved to indicate a warning speed of 90 m.p.h. Obviously any speed from 1 to 120 m.p.h. is indicatable on the selector dial. The applicant selected this speed from the standpoint of most clearly showing the structure of his device. When the vehicle begins to move, the speedometer dial 13 moves counterclockwise or to the right until that speed is reached which is the same as that shown on the selector scale 32. At that time, the trigger pin 19 strikes the arm 37 and moves the spring 47 overcenter snapping the trigger 36 counterclockwise in an arcuate path until the contacts 41 and 42 come together. The spring 47 is so constructed that the slight striking of the pin 19 against the arm 37 will effectively urge the trigger 36 to make this contact. The contacts will remain together until the speed of the vehicle has decreased to that speed indicated by the selector dial at which time a further reduction in speed will cause the trigger pin 19 to strike the arm 38 and break the contact. It is to be noted that the overcenter spring 47 must be able to move the trigger 36 yet have less tension than the speedometer hairspring (not shown).

Figure 4:
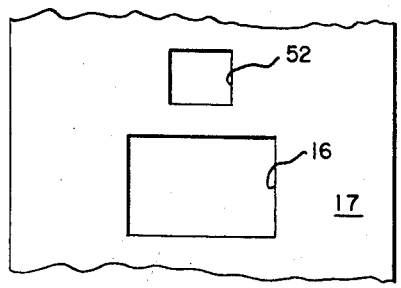
Figure 4 is a fragmentary front view of the speedometer housing showing the warning device and speedometer indicating apertures.
Figure 3:
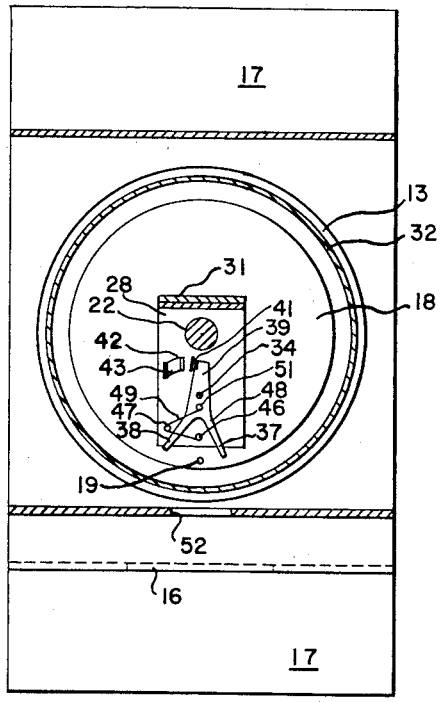
Figure 3 is a cross sectional view taken on the plane indicated by the line 3—3 of Figure 2.
Figure 2:
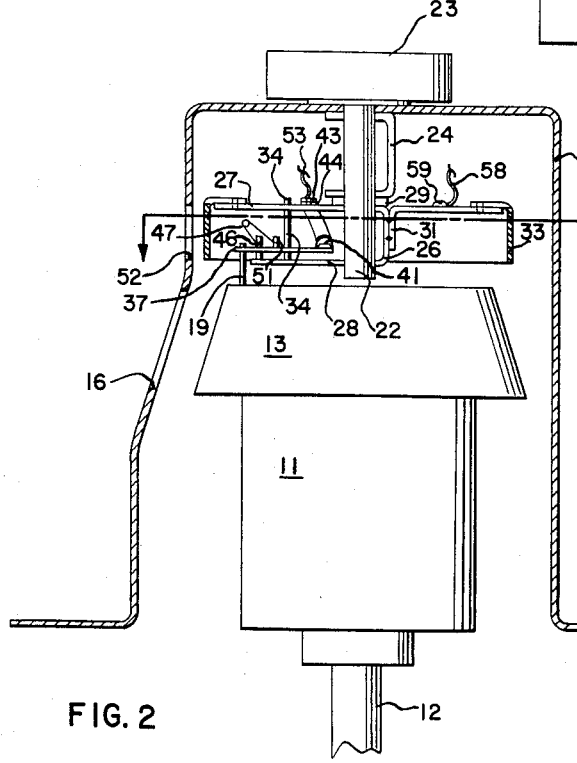
Figure 2 is a cross sectional view of the construction shown in Figure 1 taken along a vertical plane.
Figure 5:
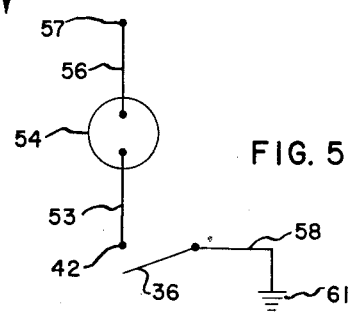
Figure 5 is a simple circuit wiring diagram which may be used with the invention.

The electrical circuit for actuating the visual or audio type warning device 56 is shown in Figure 4 and consists of a lead 53 secured to the arm 43 and to the warning device 54 such as a light, bell, buzzer or a combination of them. An additional lead 56 connects the warning device 54 to the ignition switch accessory terminal 57. The completion of the circuit is done by connecting the ground lead 58 by screw 59 to the L shaped bracket 31 and to a conventional ground 61. It is to be understood that the circuit shown is illustrative and any circuit may be employed to incorporate various warning devices without departing from the scope of this invention. If the warning device is of a visual type such as a light, it may be located near the speedometer or on the instrument panel where it is easily observed by the vehicle's operator. On the other hand, if the device is of an audible type, it may be placed wherever convenient just as long as its noise is heard by the operator.

The warning device 21 may be made inoperative by simply rotating the selector dial 33 until the vertical block 62 at the end of the scale is shown in the aperture 52. This means that the normal range of the vehicle is insufficient to rotate the speedometer dial 13 far enough for the trip pin 19 to trigger the arm 37.

It is to be understood that the invention is not to be limited to the exact construction shown and described, but that certain departures can be made without departing from my invention. For instance, the dials may be reversed with respect to rotation and the trigger mechanism may be made part of the speedometer dial and the trip pin part of the selector dial. It is also possible to use a tape type speedometer in place of the dial type disclosed herein.

What is claimed is:

1. A speed warning device for actuating alarm means mounted upon an automotive vehicle or the like having a vertically disposed eddy current magnetic type speedometer, said speedometer having a rotating dial face, said vehicle having a vertically disposed housing with access means for viewing said dial face, comprising in combination a coaxially disposed manual position means including a rotating knob and a vertically downwardly disposed shaft, means for securing said rotating means to said housing for rotational movement therewith, a substantially U shaped bracket secured adjacent its closed end to the end of said shaft, an L shaped bracket secured to the opposite side of said U shaped bracket, a coaxially aligned dial face face having speed warning indicia thereon secured to the outer ends of said brackets respectively, access means in said housing for displaying said indicia on said dial, a contact arm, said arm having a pair of extensions and a contact point, a like contact point on said U shaped bracket, said contact points adapted to be connected to alarm means mounted upon the automotive vehicle, means for pivotally mounting said arm to said contact bracket, said arm being normally positioned with the contact points apart, and a trip pin on said speedometer rotating dial for engaging one of said arm extensions and closing said contact points.

2. A speed warning device for use with a speedometer for motor vehicles or the like and adapted to actuate alarm means mounted upon the motor vehicle, said speedometer having a horizontally rotating speed indicia dial, that combination comprising a rotatable speed warning indicator, means for positioning said indicator in coaxial relationship to said indicia dial including a knob, a depending shaft secured to said knob and a U shaped bracket secured to said shaft, a trigger mechanism secured to said bracket for limited pivotal movement, contact points on said trigger and said bracket respectively and adapted to be connected to alarm means mounted upon the motor vehicle, bias means normally maintaining said contact points apart, and a trip pin secured to said indicator dial face adapted to engage said trigger mechanism when the vehicle speed shown on the rotating speed indicia dial is the same as the selected speed on the speed warning indicator, moving the trigger and closing the contact points and the subsequent lessening of the vehicle speed below the speed warning indicator results in the trip pin restriking the trigger and separating the contact points.

3. The structure defined by claim 2 which is further characterized in that the said U shaped bracket is provided with a long upper arm and a short lower arm, a vertically disposed pivot pin secured to said upper and lower arm respectively, said trigger mechanism being secured to said pivot pin and extending outwardly beyond the lower arm.

4. The structure defined by claim 2 which is further characterized in that the trigger mechanism is generally Y shaped in configuration and defines two outwardly extending arms, a vertically disposed pivot pin secured to said U shaped bracket for securing said trigger in a rotatable manner to said bracket, said bias means comprising a spring which normally maintains said contact points apart and biases said trigger so that only one of the extending arms will be struck by the trip pin.

5. The structure defined by claim 4 which is further characterized in that said Y shaped trigger is provided with a spring anchor medially of said trigger, a second anchor secured to the U shaped bracket medially of the extending arms, said spring being secured at each end to said anchors respectively.

References Cited in the file of this patent

UNITED STATES PATENTS

| | | |
|---|---|---|
| 1,538,009 | Slaight | May 19, 1925 |
| 1,602,799 | McGrath | Oct. 12, 1926 |
| 1,684,659 | Beckman | Sept. 18, 1928 |
| 2,148,801 | Bluemle et al. | Feb. 28, 1939 |
| 2,154,670 | Donally | Apr. 18, 1939 |